S. A. NEEDERMAN.
MECHANICAL TOY.
APPLICATION FILED FEB. 12, 1919.
1,322,462.
Patented Nov. 18, 1919.
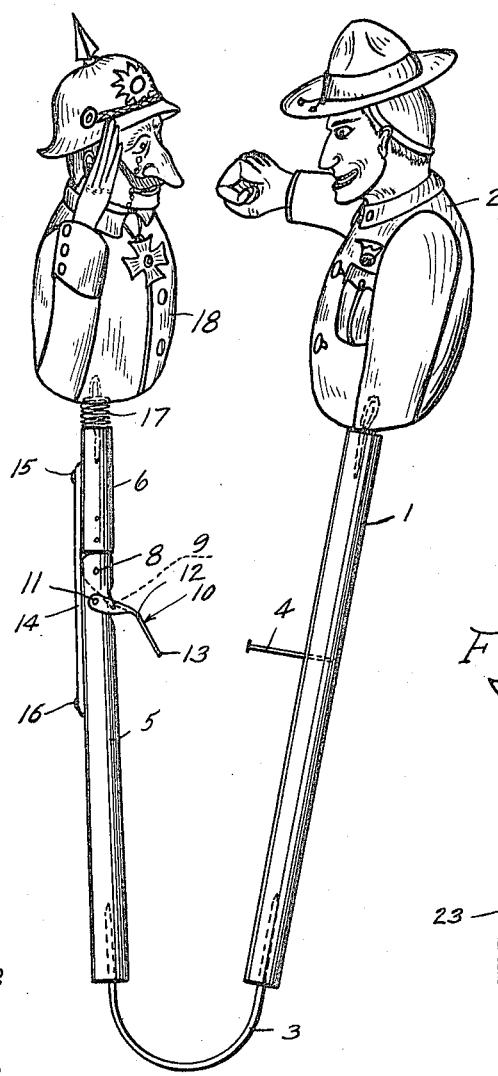
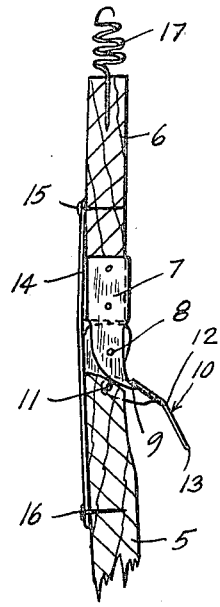
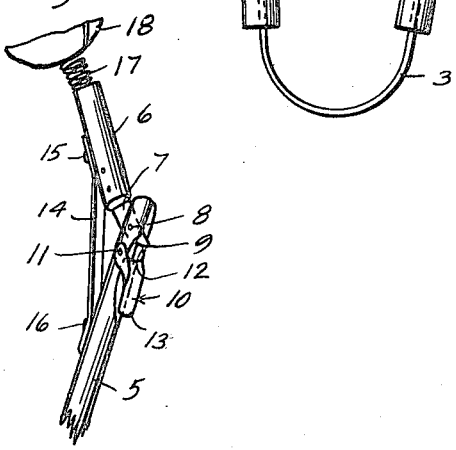
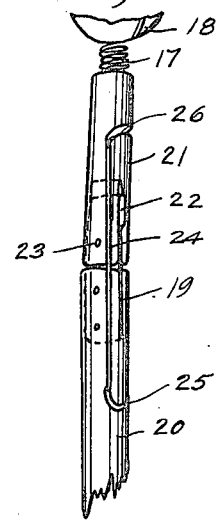
Inventor:
S. A Neederman,
by Hazard & Miller
Attys.

UNITED STATES PATENT OFFICE.

STEPHEN ARNOLD NEEDERMAN, OF LOS ANGELES, CALIFORNIA.

MECHANICAL TOY.

1,322,462.  Specification of Letters Patent.  Patented Nov. 18, 1919.

Application filed February 12, 1919. Serial No. 276,683.

*To all whom it may concern:*

Be it known that I, STEPHEN ARNOLD NEEDERMAN, a citizen of the United States, residing at Los Angeles, in the county of Los Angeles and State of California, have invented new and useful Improvements in Mechanical Toys, of which the following is a specification.

My invention relates to mechanical toys and consists of the novel features herein shown, described and claimed.

Figure 1 is a side elevation of a mechanical toy embodying the principles of my invention.

Fig. 2 is a fragmentary side elevation on the same plane as Fig. 1 showing the details of a collapsible joint, and showing the parts in collapsible position.

Fig. 3 is a view analogous to Fig. 2 and showing the joint set.

Fig. 4 is a view analogous to Figs. 2 and 3, and showing a modified construction.

A handle 1 is a straight round stick. An image 2 is rigidly attached to the upper end of the handle 1. A U-shaped spring 3 has one end driven into the lower end of the handle 1. A trip 4 is a small nail driven into the handle 1 near its longitudinal center and projecting some distance horizontally from the handle 1. A second handle 5 is a short round straight stick similar to the handle 1 and the other end of the U-shaped spring 3 is driven into the lower end of the second handle 5. An extension handle 6 matches with the handle 5 and has a metallic tongue 7 fixed in a slit formed from the lower end and the tongue 7 extends into a slot in the upper end of the second handle 5 and is connected by a pin 8 so as to make a joint between the second handle 5 and the extension handle 6. The tongue 7 has a point 9 extending below the pin 8 and a catch 10 is bifurcated to straddle the handle 5 and is held in place by a pin 11. A central portion 12 of the metal at the end of the bifurcation is adapted to engage the point 9 when the parts are straightened as in Fig. 1 and the catch swung upwardly, and a handle portion 13 of the catch projects inwardly and downwardly in position to be engaged by the trip 4 when the handles 1 and 5 are moved toward each other.

A rubber strip 14 is placed against the outside of the second handle 5 and the outside of the extension handle 6 and stretched and secured in place by tacks 15 and 16 inserted through the ends of the rubber strip into the wood. A coil spring 17 is placed against the upper end face of the extension handle 6 and one end of the wire driven down into the wood. An image 18 is attached to the upper end of the spring 17.

As shown, the image 2 is the bust and head picture of a doughboy and the image 18 is a bust and head picture of a doughboy's enemy.

When the parts are set as in Fig. 1 the operator grasps the lower end of the handle 1 and the lower end of the second handle 5, presses the handles together quickly and the doughboy's fist will strike the enemy in the face, the enemy will tremble upon the spring 17, the trip 4 will engage the handle 13 and release the catch, and the tension of the rubber strap 14 will pull the enemy over backward.

In the modified form of joint shown in Fig. 4, a piece of tin 19 is fixed in the upper end of the second handle 20 and extends upwardly into a slot in the lower end of an extension handle 21, and a flange 22 is formed upon the inner edge and upper end of the tin. The lower end of the extension handle 20 is connected to the tin by a pin 23. A rubber band 24 is inserted into a notch 25 in the second handle 20 and a notch 26 in the extension handle 21 so that the tension of the rubber band 24 is exerted to hold the joint substantially straight. As soon as the upper end of the extension handle 21 is forcibly swung away from the flange 22 until the band 24 passes the center formed by a pin 23 the tension of the band will throw the enemy backward.

Various changes may be made without departing from the spirit of my invention as claimed.

I claim:

1. A mechanical toy, comprising a stiff handle; an image mounted on the stiff handle; a jointed handle yieldingly connected to the stiff handle; means for latching the joint to make it stiff; an image mounted on the joint handle in position to contact with the image on the stiff handle; and means whereby the latch is tripped when the handles are operated to bring the handles together so that one image will fall over backward.

2. In a mechanical toy, a stiff handle; an image of a doughboy mounted on the stiff handle with the right hand in striking position; a jointed handle yieldingly connected to the stiff handle; an image of the doughboy's enemy mounted on the jointed handle in position to contact with the extended hand; means for latching the joint; and means for tripping the joint when the enemy contacts with the extended hand.

In testimony whereof I have signed my name to this specification.

STEPHEN ARNOLD NEEDERMAN.